United States Patent
Asao

(10) Patent No.: US 8,883,276 B2
(45) Date of Patent: Nov. 11, 2014

(54) RECORDING MEDIUM

(71) Applicant: Canon Kabushiki Kaisha, Tokyo (JP)

(72) Inventor: Masaya Asao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,986

(22) Filed: Jun. 4, 2013

(65) Prior Publication Data

US 2013/0330487 A1  Dec. 12, 2013

(30) Foreign Application Priority Data

Jun. 6, 2012 (JP) .................................. 2012-129096

(51) Int. Cl.

| | |
|---|---|
| B41M 5/00 | (2006.01) |
| C08K 3/36 | (2006.01) |
| C08K 3/34 | (2006.01) |
| C08K 5/54 | (2006.01) |
| B41M 5/52 | (2006.01) |
| C08K 3/22 | (2006.01) |
| B41M 5/50 | (2006.01) |
| C08K 3/18 | (2006.01) |

(52) U.S. Cl.
CPC ................ B41M 5/5218 (2013.01); C08K 3/36 (2013.01); C08K 3/34 (2013.01); C08K 5/54 (2013.01); B41M 5/5254 (2013.01); B41M 5/52 (2013.01); C08K 3/22 (2013.01); B41M 5/508 (2013.01); C08K 3/18 (2013.01)
USPC ..................................... 428/32.34; 428/32.36

(58) Field of Classification Search
CPC .... B41M 5/52; B41M 5/5218; B41M 5/5254; B41M 5/508; C08K 3/18; C08K 3/22; C08K 3/34; C08K 3/36; C08K 5/54
USPC ........................................... 428/32.34, 32.36
See application file for complete search history.

(56) References Cited

U.S. PATENT DOCUMENTS

| | | | |
|---|---|---|---|
| 2002/0081419 A1* | 6/2002 | Purbrick et al. ............... | 428/195 |
| 2004/0025746 A1* | 2/2004 | Batz-Sohn et al. ........ | 106/286.1 |
| 2006/0078696 A1* | 4/2006 | Furholz et al. ............. | 428/32.34 |

FOREIGN PATENT DOCUMENTS

| | | |
|---|---|---|
| EP | 0875394 A1 | 11/1998 |
| JP | s57107878 A | 7/1982 |
| JP | S60174684 A | 9/1985 |
| JP | s61-116579 A | 6/1986 |
| JP | 2000-154017 A | 6/2000 |
| JP | 2008-254430 A | 10/2008 |
| JP | 2010-222151 A | 10/2010 |
| JP | 2011-201147 A | 10/2011 |
| JP | 2011-218580 A | 11/2011 |
| WO | 2010123505 A1 | 10/2010 |

* cited by examiner

*Primary Examiner* — Betelhem Shewareged
(74) *Attorney, Agent, or Firm* — Canon U.S.A., Inc. IP Division

(57) ABSTRACT

There is provided a recording medium including a substrate and an ink-receiving layer formed on at least one surface of the substrate, wherein the ink-receiving layer contains an inorganic pigment, a binder, and a compound containing aluminum, silicon, and at least one element selected from Group 2 and 3 elements of the periodic table, and the compound content is in the range of 0.1 mass % to 30 mass % relative to the inorganic pigment content.

6 Claims, 1 Drawing Sheet

RECORDING MEDIUM

BACKGROUND OF THE INVENTION

1. Field of the Invention

The present invention relates to a recording medium.

2. Description of the Related Art

There have been studies in which a variety of materials are incorporated into an ink-receiving layer to impart desired properties to a recording medium (Japanese Patent Laid-Open Nos. 2008-254430 and 2011-218580). Japanese Patent Laid-Open No. 2008-254430 discloses a recording medium having an ink-receiving layer containing a compound which is prepared by a reaction of an amino group-containing silane coupling agent with a zirconium compound and which thus has an amino group and contains zirconium and silicon, and the recording medium can enhance the fixing properties of ink and the sharpness of images. Japanese Patent Laid-Open No. 2011-218580 discloses a recording medium having ink-receiving layer containing a compound which contains silicon and at least one element selected from Group 2 and 3 elements of the periodic table, and the recording medium can enhance the color developability and ozone resistance of images and reduce bleeding in images stored at high temperature and humidity.

Japanese Patent Laid-Open No. 2011-201147 discloses a recording medium having an ink-receiving layer which contains water-soluble aluminosilicate chloride having an Al/Si ratio of not less than 5 and an OH/Al ratio ranging from 1 to 2, inorganic fine particles, and a water-soluble resin, and the recording medium can enhance ozone resistance and water resistance without a reduction in image density. Japanese Patent Laid-Open No. 61-116579 discloses a recording medium containing two-layer-structure microcrystalline phyllosilicate on the surface thereof or therein, and the recording medium exhibits high ink absorbability. Japanese Patent Laid-Open No. 2010-222151 discloses a silica-based material containing silicon; aluminum; at least one fourth-row element selected from the group consisting of iron, cobalt, nickel, and zinc; and at least one basic element selected from the group consisting of alkali metal elements, alkaline-earth metal elements, and rare-earth elements, and such a silica-based material is a material exhibiting high mechanical strength and a large specific surface area. Japanese Patent Laid-Open No. 2000-154017 discloses a silica-based amorphous material containing silica, 0 to 15 wt % of an oxide of at least one component selected from Na, K, Ca, and Mg, and 0 to 15 wt % of an oxide of at least one component selected from Zr, Ti, Ge, Ga, and Al, and such a silica-based amorphous material is a material exhibiting high mechanical strength and a large specific surface area.

SUMMARY OF THE INVENTION

The present invention provides a recording medium which can enhance color developability and ozone resistance of images and reduce bleeding in images stored at high temperature and humidity for a long time.

An aspect of the present invention provides a recording medium including a substrate and an ink-receiving layer formed on at least one surface of the substrate, wherein the ink-receiving layer contains an inorganic pigment, a binder, and a compound containing aluminum, silicon, and at least one element selected from Group 2 and 3 elements of the periodic table, and the compound content is in the range of 0.1 mass % to 30 mass % relative to the inorganic pigment content.

The present invention enables a recording medium which can enhance color developability and ozone resistance of images and reduce bleeding in images stored at high temperature and humidity for a long time.

Further features of the present invention will become apparent from the following description of exemplary embodiments with reference to the attached drawings.

DESCRIPTION OF THE EMBODIMENTS

Aspects of the present invention will now be described in detail with reference to embodiments.

The inventors have conducted studies and found that typical recording media disclosed in Japanese Patent Laid-Open Nos. 2008-254430 and 2011-218580 cannot provide significant advantages in all of color developability and ozone resistance of images and reduction in bleeding in images stored at high temperature and humidity for a long time.

In the recording medium disclosed in Japanese Patent Laid-Open No. 2008-254430, the color developability of images is enhanced; in contrast, the ozone resistance of images is poor, and bleeding is caused in images stored at high temperature and humidity.

In the recording medium disclosed in Japanese Patent Laid-Open No. 2011-218580, the color developability and ozone resistance of images are enhanced; however, bleeding is caused in images stored at high temperature and humidity for a long time.

In the recording media disclosed in Japanese Patent Laid-Open Nos. 2011-201147 and 61-116579 and in the recording media disclosed in Japanese Patent Laid-Open Nos. 2010-222151 and 2000-154017 and having an ink-receiving layer containing a silica-based material, the ozone resistance of images is poor.

Figure 1:
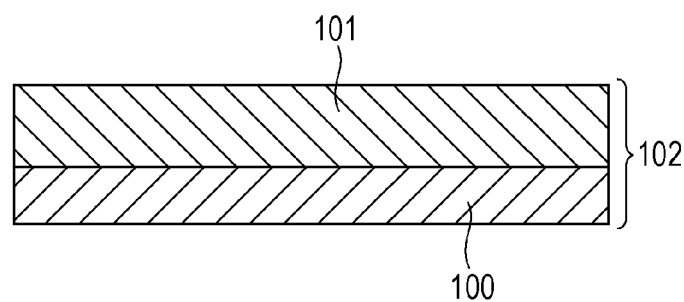
FIG. 1 is a schematic cross-sectional view illustrating a recording medium according to an embodiment of the present invention.

FIG. 1 is a schematic cross-sectional view illustrating an example of a recording medium of the present invention, in which a recording medium 102 includes a substrate 100 and an ink-receiving layer 101 formed on one surface of the substrate 100. The ink-receiving layer may be formed on both surfaces of the substrate. The ink-receiving layer 101 contains a compound which contains aluminum, silicon, and at least one element selected from Group 2 and 3 elements of the periodic table (hereinafter simply referred to as "composite compound"). The at least one element selected from Group 2 and 3 elements of the periodic table is also referred to as a "Group 2 or 3 element", and a compound containing at least one element selected from Group 2 and 3 elements of the periodic table is also referred to as a "Group 2 or 3 element compound".

Description will now be made about how the present invention has been accomplished and the presumed mechanism which enables excellent effects in which the recording medium of the present invention can enhance color developability and ozone resistance of images and reduce bleeding in images stored at high temperature and humidity for a long time.

The inventors have conducted studies and found that a recording medium having an ink-receiving layer containing the above-mentioned composite compound can exhibit excellent ozone resistance. It is believed that such an effect can be obtained due to the following reason: an inorganic pigment contained in the ink-receiving layer is a solid acid having acid points on the surface thereof, and the acid strength of the acid points can be reduced by adhesion of the composite compound to the acid points, which can reduce generation of radicals due to contact of the acid points with ozone.

Furthermore, since the above-mentioned composite compound contains aluminum in its structure, a Group 2 or 3 element contained in the composite compound is less likely to be dissolved even when the recording medium is stored for a long time. Hence, it is believed that ink bleeding, which is caused by the deliquescence of salts of the dissolved Group 2 or 3 element at high temperature and humidity, is reduced.

Since the ink-receiving layer contains the above-mentioned elements in the form of a composite compound, aggregates are less likely to be generated during preparation of a coating solution used for forming the ink-receiving layer, and high transparency is exhibited, as compared with the case in which the ink-receiving layer contains compounds derived from individual elements (Group 2 or 3 element compound, aluminum compound, and silane coupling agent); thus, images to be formed can exhibit high color developability.

In order to provide a recording medium which can enhance the color developability and ozone resistance of images and reduce bleeding in images stored at high temperature and humidity for a long time, as well as incorporating the above-mentioned composite compound into the ink-receiving layer, a mass ratio of such a compound to an inorganic pigment contained in the ink-receiving layer needs to be adjusted to be in a specific range to allow the composite compound to adhere at acid points on the surface of the inorganic pigment. The inventors have found that the composite compound content needs to be in the range of 0.1 mass % to 30 mass % relative to the inorganic pigment content.

The individual components synergistically influence each other through the mechanism described above, which enables the effects of the present invention to be realized.

The inventors have also studied the reason why traditional recording media cannot provide effects which can be achieved by the present invention.

In the case where a recording medium has an ink-receiving layer containing a compound which contains zirconium and silicon as disclosed in Japanese Patent Laid-Open No. 2008-254430, the acid strength of acid points generated by a reaction of an inorganic pigment contained in the ink-receiving layer with water are not sufficiently reduced, and radicals generated upon contact of the acid points with ozone in air decrease the ozone resistance of images. Long-term storage of such a recording medium causes dissolution of zirconium which readily results in formation of salts of the dissolved zirconium, and such salts deliquesce at high temperature and humidity and thus cause ink bleeding.

In the case where a recording medium has an ink-receiving layer containing a compound which contains silicon and at least one element selected from Group 2 and 3 elements of the periodic table as disclosed in Japanese Patent Laid-Open No. 2011-218580, bleeding is caused by long-term storage of images at high temperature and humidity. This phenomenon occurs due to the following reason: Group 2 and 3 elements in the composite compound are dissolved during the long-term storage and form their salts, and the salts deliquesce at high temperature and humidity with the result that ink is likely to bleed. Such a phenomenon does not occur in the case of short-term storage such as about one week but occurs in the case of long-term storage such as four weeks.

The silicates used in recording media disclosed in Japanese Patent Laid-Open Nos. 2011-201147 and 61-116579 and the silica-based materials disclosed in Japanese Patent Laid-Open Nos. 2010-222151 and 2000-154017 do not adhere to acid points on a surface of an inorganic pigment contained in an ink-receiving layer. Hence, the acid strength of acid points on the inorganic pigment as a solid acid cannot be reduced with the result that images exhibit low ozone resistance.

Materials of the recording medium of the present invention will now be described further in detail.

Recording Medium

The recording medium of the present invention includes a substrate and an ink-receiving layer formed on at least one surface of the substrate. Components of the recording medium of the present invention will now be described.

Ink-Receiving Layer

The ink-receiving layer included in the recording medium of the present invention contains an inorganic pigment, a binder, and a compound which contains aluminum, silicon, and at least one element selected from Group 2 and 3 elements of the periodic table.

In the present invention, the thickness of the ink-receiving layer may be from 15 μm to 45 μm. In order to determine the thickness, the thickness of the ink-receiving layer is measured at five or more points on the cross section of a recording medium with a scanning electron microscope (SEM), and the average value of the thicknesses is calculated. Components of the ink-receiving layer will now be described.

(1) Compound Containing Aluminum, Silicon, and at Least One Element Selected from Group 2 and 3 Elements of Periodic Table The composite compound content needs to be in the range of 0.1 mass % to 30 mass % relative to the inorganic pigment content in the ink-receiving layer as described above. Furthermore, the composite compound content is preferably in the range of 1 mass % to 25 mass %, and more preferably 3 mass % to 20 mass % relative to the inorganic pigment content in the ink-receiving layer.

Analytical Method

A compound produced by the method which will be described later is analyzed by X-ray diffractometry (XRD) to confirm whether the composite compound containing a Group 2 or 3 element, aluminum, and silicon has been obtained or not. In particular, in an XRD chart of a produced compound, if the X-ray diffraction peaks of a Group 2 or 3 element compound and an aluminum compound used as materials disappear and, in addition, the new X-ray diffraction peak of the composite compound having an amorphous structure and containing the Group 2 or 3 element compound, aluminum, and silicon can be confirmed, it is determined that a composite compound having a —Si—O-M-O—Si— structure (M represents a Group 2 or 3 element) and a —Si—O—Al—O—Si— structure has been obtained.

In order to determine whether the ink-receiving layer of a produced recording medium contains a composite compound containing a Group 2 or 3 element, aluminum, and silicon or not, the ink-receiving layer can be analyzed by elemental mapping with a transmission electron microscope (TEM).

Production Method

Examples of a method for producing a compound containing aluminum, silicon, and at least one element selected from Group 2 and 3 elements of the periodic table include, but are not limited to, the following first and second methods involving use of a Group 2 or 3 element compound, an aluminum compound, and a silane coupling agent.

In the first method, a Group 2 or 3 element compound and an aluminum compound are allowed to react with a silane coupling agent at the same time to produce a composite compound. In particular, a Group 2 or 3 element compound and an aluminum compound are added to a liquid solvent, and a silane coupling agent is gradually added to the solution while the solution is stirred. Water or alcohol can be used as the liquid solvent, and a mixture of water and alcohol may be used. Then, the resulting solution is further stirred, which induces a hydrolysis reaction of the silane coupling agent to generate silanols (Si—OH). Then, a condensation reaction of the silanols occurs to form a silane oligomer; in this process, a Group 2 or 3 element and aluminum are incorporated into the silane oligomer to form a compound having a —Si—O-M-O—Si— structure (M represents at least one element selected from the Group 2 and 3 of elements of the periodic table) and a —Si—O—Al—O—Si— structure. The hydrolysis reaction and condensation reaction of the silane coupling agent can be controlled by adjustment of the pH of the system and heating. The heating temperature varies depending on types of the silane coupling agent and may be generally from 20° C. to 100° C.

In other words, the above-mentioned composite compound may be produced through the following steps: a Group 2 or 3 element compound and an aluminum compound and a silane coupling agent are added to a liquid solvent containing at least any of water and alcohol, and the silane coupling agent in the liquid solvent then undergoes hydrolysis and condensation.

A specific example of the first method will now be described. An aqueous solution is prepared by dissolving a Group 2 or 3 element compound (magnesium chloride hexahydrate) and an aluminum compound (polyaluminum chloride), and then N-2-(aminoethyl)-3-aminopropyltrimethoxysilane is added to the aqueous solution. Then, the silane coupling agent is hydrolyzed, and the hydrolysate is heated to induce dehydration condensation, thereby producing a composite compound in which magnesium and aluminum are incorporated into the structure of a silane oligomer.

In the second production method, a composite of any one of a Group 2 or 3 element compound and an aluminum compound with a silane coupling agent is formed in a liquid solvent containing at least any of water and alcohol, thereby forming a precursor; and a composite of the other one of the Group 2 or 3 element compound and the aluminum compound with the precursor is formed, thereby producing a composite compound. It is presumed that a composite compound produced by the second production method includes a portion containing the —Si—O-M-O—Si— structure (M represents at least one element selected from Group 2 and 3 elements of the periodic table) in a high proportion and a portion containing the —Si—O—Al—O—Si— structure in a high proportion. The inventors have conducted studies and found that a composite compound produced by the second production method contributes to an enhancement in the light resistance of images. It is believed that this effect is achieved due to the following reason: such a composite compound includes a portion containing polyvalent metal in a high proportion as described above and thus effectively contributes to agglomeration of colorants included in an ink.

A Group 2 or 3 element compound, an aluminum compound, and a silane coupling agent as the materials of the composite compound containing a Group 2 or 3 element, aluminum, and silicon will now be individually described in detail.

Compound Containing at Least One Element Selected from Group 2 and 3 Elements of Periodic Table The term "at least one element selected from Group 2 and 3 elements of the periodic table" herein refers to an element or elements belonging to Group 2 or 3 of the periodic table. In particular, the Group 2 or 3 element may be at least one element selected from magnesium (Mg), calcium (Ca), strontium (Sr), yttrium (Y), lanthanum (La), and cerium (Ce).

Examples of the Group 2 or 3 element compound include salts composed of ions of a Group 2 or 3 element and organic or inorganic acid ions, hydrates of these salts, and oxides of a Group 2 or 3 element. Specific examples of the organic acid ions include acetate ions and oxalate ions. Specific examples of the inorganic acid ions include sulfate ions, nitrate ions, carbonate ions, halogen ions, and hydroxyl ions.

Specific examples of the Group 2 or 3 element compound include magnesium acetate tetrahydrate, calcium acetate monohydrate, strontium acetate hemihydrate, calcium chloride, calcium formate, calcium sulfate, magnesium sulfate, magnesium chloride hexahydrate, magnesium citrate nonahydrate, strontium nitrate, yttrium acetate n-hydrate, yttrium chloride hexahydrate, yttrium nitrate hexahydrate, lanthanum nitrate hexahydrate, lanthanum chloride heptahydrate, lanthanum acetate sesquihydrate, lanthanum benzoate, cerium chloride heptahydrate, ceric sulfate tetrahydrate, cerium octylate, calcium hydroxide, magnesium hydroxide, magnesium oxide, yttrium oxide, lanthanum oxide, and cerium oxide. The composite compound used in the present invention may contain multiple Group 2 or 3 elements.

The number of atoms of the Group 2 or 3 element of the periodic table, which is contained in the composite compound, is preferably at least 0.001 times and at most 0.03 times, and more preferably at least 0.001 times and at most 0.02 times the number of atoms of the metallic element constituting the inorganic pigment. In the case where the number of atoms of the Group 2 or 3 element of the periodic table is at least 0.001 times the number of atoms of the metallic element, excellent ozone resistance can be exhibited. In the case where the number of atoms of the Group 2 or 3 element of the periodic table is at most 0.03 times the number of atoms of the metallic element, bleeding in images at high temperature and humidity can be effectively reduced. In the present invention, the above-mentioned ratio of the number of atoms in the ink-receiving layer can be determined by inductively coupled plasma optical emission spectrometry (ICP-OES). In the case where the ink-receiving layer contains multiple types of inorganic pigments and Group 2 or 3 elements, the ratio of the number of atoms can be determined from the total number of these elements.

The number of atoms of the Group 2 or 3 element of the periodic table, which is contained in the composite compound, is preferably at least 0.1 times and at most 5 times, and more preferably at least 0.5 times and at most 2 times the number of atoms of silicon contained in the composite compound.

Aluminum Compound

Any aluminum compound in which aluminum is contained in its structure can be used; in particular, water-soluble aluminum compounds may be employed. Examples of the water-soluble aluminum compounds include basic polyaluminum chloride, polyaluminum chloride, aluminum sulfate, aluminum sulfite, aluminum thiosulfate, aluminum nitrate nonahydrate, and aluminum chloride hexahydrate. In particular, one material selected from basic polyaluminum chloride and polyaluminum chloride can be employed as the aluminum compound used in the present invention. The aluminum compounds described above can be used alone or in combination of two or more.

The ratio (C/A) of the number of atoms of aluminum (C) to the number of atoms of the metallic element (A) constituting the inorganic pigment contained in the ink-receiving layer is preferably in the range of 0.001 to 0.05, and more preferably 0.001 to 0.03. At the ratio of the number of atoms (C/A) of not less than 0.001, bleeding in images stored at high temperature and humidity can be further reduced. At the ratio of the number of atoms (C/A) of not more than 0.05, ink absorbability can be enhanced. The ratio of the number of atoms (C/A) in the ink-receiving layer can be determined by inductively coupled plasma optical emission spectrometry (ICP-OES).

The ratio of the number of atoms of aluminum (C) to the number of atoms of silicon (X) contained in the composite compound (C/X) is preferably in the range of 0.1 to 5, more preferably 0.2 to 3, and especially preferably 0.5 to 2. The ratio of the number of atoms (C/X) can be determined as with the ratio of the number of atoms (C/A).

Silane Coupling Agent

The silane coupling agent to be used may have a structure represented by the following general formula (1).

$$R_pSiX_{4-p} \quad (1)$$

In the general formula (1), R represents a hydrocarbon group, X represents a hydrolysable group, and p is an integer from 1 to 3. In the case where multiple Rs are contained (p=2 or 3), such Rs may be the same as or different from each other.

Examples of the hydrocarbon group represented by R in the generally formula (1) include an alkyl group, an alkenyl group, and an aryl group. Furthermore, R may have a substituent. Examples of such a substituent include an alkyl group, an alkenyl group, an aryl group, an alkynyl group, an aralkyl group, an amino group, a diamino group, an epoxy group, a mercapto group, a glycidoxy group, a methacryloxy group, a ureide group, a chloro group, a cyano group, an isocyanate group, and a vinyl group. The number of carbon atoms of R may be from 2 to 10. At the number of carbon atoms of not less than two, sufficient hydrophobic properties can be readily exhibited. At the number of carbon atoms of not more than ten, a reduction in the dispersion stability of the composite compound due to enhanced hydrophobic properties can be inhibited, and, in addition, the adhesion of the composite compound to an inorganic pigment can be enhanced. Examples of X include an alkoxyl group, an alkoxyalkoxyl group, a halogen atom, and an acyloxy group. Specific examples thereof include a methoxy group, an ethoxy group, and a chloro group.

Specific examples of the silane coupling agent include dialkoxysilane compounds such as methyltrimethoxysilane, methyltriethoxysilane, methyltrichlorosilane, vinyltrichlorosilane, vinyltriacetoxysilane, vinyl tris(β-methoxyethoxy) silane, vinyltriethoxysilane, vinyltrimethoxysilane, γ-methacryloxypropyltrimethoxysilane, γ-methacryloxypropylmethyldimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-mercaptopropylmethyldimethoxysilane, γ-chloropropyltrimethoxysilane, γ-chloropropylmethyldichlorosilane, γ-chloropropylmethyldimethoxysilane, γ-chloropropylmethyldiethoxysilane, γ-ureidopropyltriethoxysilane, γ-anilinopropyltrimethoxysilane, and octadecyldimethyl[3-(trimethoxysilyl)propyl]ammonium chloride; diacyloxysilane compounds; trialkoxysilane compounds; triacyloxysilane compounds; triphenoxysilane compounds; and hydrolysates thereof. These silane coupling agents may be used alone or in combination of two or more.

(2) Inorganic Pigment

In the present invention, the inorganic pigment contained in the ink-receiving layer may have an average primary particle size of not less than 1 nm. Furthermore, the average primary particle size is preferably not more than 1 μm, and more preferably not more than 50 nm. Moreover, in order to form a porous structure exhibiting good ink absorption properties for an enhancement in the fixing properties of ink, the average primary particle size is especially preferably not more than 20 nm. The term "the average primary particle size of the inorganic pigment" herein refers to the number-average diameter of circles having areas equivalent to the projection areas of primary particles of the inorganic pigment when the inorganic pigment is observed with an electron microscope. In this case, at least 100 particles are subjected to measurement.

In the present invention, the inorganic pigment content (mass %) in the ink-receiving layer may be in the range of 70 mass % to 95 mass %. At the inorganic pigment content of not less than 70 mass %, the fixing properties of ink are further enhanced. At the inorganic pigment content greater than 95 mass %, cracking occurs during formation of the ink-receiving layer in some cases.

In the present invention, the amount (g/m²) of the inorganic pigment added in a process for forming the ink-receiving layer may be in the range of 8 g/m² to 45 g/m².

Examples of the inorganic pigment used in the present invention include alumina hydrate, alumina, silica, colloidal silica, titanium dioxide, zeolite, kaolin, talc, hydrotalcite, zinc oxide, zinc hydroxide, aluminum silicate, calcium silicate, magnesium silicate, zirconium oxide, and zirconium hydroxide. These inorganic pigments can be used alone or in combination of two or more. Among these inorganic pigments, alumina hydrate and silica may be employed because such inorganic pigments enable formation of a porous structure exhibiting high ink absorption properties.

Alumina Hydrate

An alumina hydrate represented by the following general formula (2) may be contained in the ink-receiving layer.

$$Al_2O_{3-n}(OH)_{2n} \cdot mH_2O \quad (2)$$

In the general formula (2), n is 0, 1, 2, or 3; and m represents a value from 0 to 10, preferably 0 to 5. In many cases, mH₂O represents an aqueous phase which does not participate in the formation of a crystal lattice and which is eliminable, and m can be therefore a value other than an integer. When the alumina hydrate is heated, m may reach a value of 0 in some cases. However, m and n do not represent 0 at the same time.

In the present invention, the alumina hydrate can be produced by known methods. Specific examples of such known methods include a method involving hydrolysis of aluminium alkoxide, a method involving hydrolysis of sodium aluminate, a method involving neutralization of an aqueous sodium aluminate solution with an aqueous solution of, for instance, aluminum sulfate or aluminum chloride.

It is known that alumina hydrate has a variety of crystal structures on the basis of the temperature of a thermal treatment, such as an amorphous structure, a gibbsite structure, and a boehmite structure, and alumina hydrate having any crystal structure selected from such structures may be used. Among these structures, an alumina hydrate exhibiting a boehmite structure or amorphous structure when analyzed by X-ray diffractometry are preferably employed in the present invention. Specific examples thereof include alumina hydrates disclosed in Japanese Patent Laid-Open Nos. 7-232473, 8-132731, 9-66664, and 9-76628; and commercially available products such as Disperal HP14 (manufactured by Sasol Limited) and Disperal HP18 (manufactured by Sasol Limited). These alumina hydrates may be used alone or in combination of two or more.

In the present invention, the pore volume of the alumina hydrate is preferably in the range of 0.3 ml/g to 1.0 ml/g, and more preferably 0.35 ml/g to 0.9 ml/g. The specific surface area of the alumina hydrate determined by the BET method is preferably from 50 $m^2/g$ to 350 $m^2/g$, and more preferably from 100 $m^2/g$ to 250 $m^2/g$. The BET method is one of methods used for measuring the surface area of powder by gas-phase adsorption, in which the total surface area of 1 g of a sample, namely, a specific surface area, is determined from an adsorption isotherm. In general, nitrogen gas is used as adsorption gas in many cases, and an adsorption amount is measured from the change in pressure or volume of the adsorbed gas in most cases. The Brunauer-Emmett-Teller equation is the most well-known equation for indicating the isotherm of multimolecular adsorption, which is called the BET method and widely used to determine a specific surface area. An adsorption amount is obtained by the BET equation, and the obtained adsorption amount is multiplied by an area occupied by one molecule adsorbed on a surface, thereby determining the specific surface area. In the BET method, the relationship between a relative pressure and the amount of adsorbed gas is measured at several points by the nitrogen adsorption-desorption method, and the slope and intercept of the plot are obtained by the least squares method, thereby deriving the specific surface area. Hence, in order to enhance the accuracy of the measurement, the relationship between a relative pressure and the amount of adsorbed gas is measured preferably at 5 or more points, more preferably 10 or more points.

In the present invention, the amount ($g/m^2$) of the alumina hydrate added in a process for forming the ink-receiving layer is preferably not less than 15 $g/m^2$. Furthermore, such an amount is more preferably in the range of 25 $g/m^2$ to 45 $g/m^2$. In the case where the amount of the alumina hydrate is not less than 25 $g/m^2$, the fixing properties of ink are further enhanced. In the case where the amount of the alumina hydrate is larger than 45 $g/m^2$, cracking occurs during formation of the ink-receiving layer in some cases.

Silica

In general, silica, which is contained in the ink-receiving layer, is broadly classified into a wet process silica and a dry process (gas-phase process) silica on the basis of the production process thereof. In a known wet process, active silica is generated by acid decomposition of a silicate and is then appropriately polymerized to obtain hydrous silica through aggregation and precipitation. On the other hand, in a known dry process (gas-phase process), anhydrous silica is obtained by vapor-phase hydrolysis of a silicon halide at high temperature (flame hydrolysis process) or by heating, reducing, and vaporizing silica sand and coke by arc in an electric furnace and then oxidizing this product in air (arc process). In the present invention, silica obtained by a dry process (gas-phase process) may be employed (hereinafter referred to as "gas-phase silica"). Gas-phase silica is used for the following reason: gas-phase silica has a particularly large specific surface area and thus exhibits high ink absorbability and high efficiency of ink retention, and the gas-phase silica has a low refractive index and can therefore impart transparency to a receiving layer, which can leads to good color developability. Specific examples of the gas-phase silica include AEROSIL (manufactured by Nippon Aerosil Co., Ltd.) and REOLOSIL type-QS (manufactured by Tokuyama Corporation).

In the present invention, the specific surface area of the gas-phase silica measured by the BET method is preferably in the range of 90 $m^2/g$ to 400 $m^2/g$, and more preferably 200 $m^2/g$ to 350 $m^2/g$.

In the present invention, the amount ($g/m^2$) of the gas-phase silica added in a process for forming the ink-receiving layer is preferably not less than 8 $g/m^2$. Furthermore, the amount of the gas-phase silica is more preferably from 10 $g/m^2$ to 30 $g/m^2$. In the case where the amount of the gas-phase silica is not less than 10 $g/m^2$, the fixing properties of ink are further enhanced. In the case where the amount of the gas-phase silica is larger than 30 $g/m^2$, cracking occurs during formation of the ink-receiving layer in some cases.

Surface Treatment of Inorganic Pigment

In the present invention, the inorganic pigment may be subjected to a surface treatment with the above-mentioned composite compound. The surface treatment with the above-mentioned composite compound can reduce generation of acid points on the surface of the inorganic pigment, which can further enhance the ozone resistance of images. Dispersion stability is higher in a coating solution containing the inorganic pigment subjected to the surface treatment with the composite compound than in a coating solution separately containing the composite compound and the inorganic pigment. Hence, the ink-receiving layer formed by applying such a coating solution to a substrate exhibits high transparency, which can further enhance the color developability of images to be formed.

Whether the inorganic pigment has been surface-treated with the above-mentioned composite compound or not can be confirmed with X-ray photoelectron spectrometry (XPS). In particular, the peak position in the spectrum of atomic orbital in the inorganic pigment subjected to the surface treatment with the composite compound chemically shifts to a lower energy side as compared with the peak position in the spectrum of atomic orbital in a non-surface-treated inorganic pigment. Accordingly, in order to confirm whether a specific inorganic pigment has been surface-treated with the composite compound or not, the peak position in the spectrum of atomic orbital in this inorganic pigment is measured with XPS, and the obtained peak position is compared with the peak position in the spectrum of atomic orbital in a non-surface-treated inorganic pigment; if chemical shift of the peak position to a lower energy side is confirmed, such an inorganic pigment can be determined as a surface-treated inorganic pigment. In the case of an alumina hydrate, for example, the spectrum of atomic orbital in an inorganic pigment refers to the spectrum of the 2p orbital of aluminum atoms and the spectrum of the 2s orbital thereof.

In an example of surface treatment of the inorganic pigment, a dispersion liquid prepared by dispersing the composite compound and the inorganic pigment in a solvent such as water is heat-dried with an oven or spray-dried with a spray drier. The surface treatment involving spray drying with a spray drier enables the composite compound to uniformly exist on the surface of the inorganic pigment and may be therefore employed. The heating temperature during drying may be 100° C. or higher. In the case where the inorganic pigment is an alumina hydrate, drying at a temperature higher than 400° C. converts the alumina hydrate phase into the α-alumina phase, and the temperature may be therefore 400° C. or lower.

In particular, the surface treatment of the inorganic pigment may include the following processes of (i) dispersion, (ii) pH adjustment, and (iii) surface treatment, which can inhibit an increase of the viscosity of a coating solution used for forming the ink-receiving layer during preparation thereof and enhance the fixing properties of ink.

(i) Dispersion Process

The dispersion process includes a first dispersion step and a second dispersion step. Either of the first and second dispersion steps may be carried out in advance, or both the steps may be simultaneously carried out.

In the first dispersion step, an inorganic pigment is dispersed in a liquid solvent containing water or alcohol to produce an inorganic pigment dispersion liquid. In the second dispersion step, the composite compound is dispersed in a liquid solvent containing water or alcohol to produce a composite compound dispersion liquid. In the first and second dispersion steps, for instance, a homomixer, an agitator, a ball mill, or an ultrasonic disperser may be used.

(ii) pH Adjustment Process

In the pH adjustment process, the inorganic pigment dispersion liquid and composite compound dispersion liquid produced in the dispersion process are subjected to pH adjustment such that the difference between the $pH_2$ of the composite compound dispersion liquid and the $pH_1$ of the inorganic pigment dispersion liquid ($pH_2-pH_1$) is not more than 1.6. In the pH adjustment process, the pH may be adjusted by any technique; for example, acid or alkali is added to each dispersion liquid. The pH is adjusted in this manner for the following reason.

In the inorganic pigment dispersion liquid, an electrical double layer generated at the interface of the inorganic pigment to the liquid solvent enables stable dispersion of the inorganic pigment. In the case where such an inorganic pigment dispersion liquid is mixed with the composite compound dispersion liquid, a large difference in the pH between the individual dispersion liquids breaks the above-mentioned electrical double layer during the mixing, which results in a decrease in the dispersion stability of the inorganic pigment. Hence, the $pH_1$ of the inorganic pigment dispersion liquid and the $pH_2$ of the composite compound dispersion liquid can be preliminarily adjusted such that the difference between the $pH_2$ and the $pH_1$ ($pH_2-pH_1$) is preferably not more than 1.6. Moreover, the $pH_2-pH_1$ is more preferably not more than 1.0. In the present invention, in order to reduce a change in the dispersion state of the inorganic pigment as much as possible, the $pH_2$ of the composite compound dispersion liquid may be adjusted without adjustment of the $pH_1$ of the inorganic pigment dispersion liquid. The $pH_1$ of the inorganic pigment dispersion liquid may be in the range of 2 to 6. The $pH_2$ of the composite compound dispersion liquid is preferably in the range of 1 to 7.5, and more preferably 2 to 7.

(iii) Surface Treatment Process

In the surface treatment process, the pigment dispersion liquid and composite compound dispersion liquid subjected to the pH adjustment in the pH adjustment process are mixed and then heated to treat the surface of the inorganic pigment with the composite compound. Heating the mixture liquid causes the evaporation of the liquid solvent contained in the mixture liquid, and the surface of the inorganic pigment can be therefore efficiently treated with the composite compound.

The pigment dispersion liquid and the composite compound dispersion liquid may be mixed by any method; the composite compound dispersion liquid may be added dropwise to the inorganic pigment dispersion liquid, or the inorganic pigment dispersion liquid may be added dropwise to the composite compound dispersion liquid. The inorganic pigment dispersion liquid and the composite compound dispersion liquid may be simultaneously put into an empty container. The mixture liquid of the pigment dispersion liquid and the composite compound dispersion liquid can be heated by any method, and known heaters, such as an oven and a spray dryer, can be properly used. The temperature at which the mixture liquid is heated may be not less than 100° C. to effectively remove a liquid solvent, such as water and alcohol, from the system. Furthermore, the temperature may be not more than 400° C. to reduce coarsening and phase transition of the inorganic pigment particles. Although the heating time is not specifically limited, heating can be carried out until the liquid solvent in the mixture solution has evaporated. For instance, in the case where the mixture liquid is heated at 120° C., the heating can be carried out for 3 hours or longer.

(3) Binder

In the present invention, the ink-receiving layer contains a binder. Any binder which can bind the inorganic pigment particles to each other for film formation and which does not impair the effects of the present invention can be used.

Examples of the binder include starch derivatives such as oxidized starch, etherified starch, and phosphorylated starch; cellulose derivatives such as carboxymethyl cellulose and hydroxyethyl cellulose; casein, gelatin, soy protein, polyvinyl alcohol (PVA), and derivatives thereof; conjugated polymer latexes such as polyvinylpyrrolidone, maleic anhydride resins, styrene-butadiene copolymers, and methyl methacrylate-butadiene copolymers; acrylic polymer latexes such as acrylic ester polymers and methacrylic ester polymers; vinyl polymer latexes such as ethylene-vinyl acetate copolymers; functional group-modified polymer latexes of the above-mentioned polymers, which are prepared from monomers containing a functional group such as a carboxyl group; products prepared by cationizing the above-mentioned polymers with a cationic group; products prepared by cationizing the surfaces of the above-mentioned polymers with a cationic surfactant; products prepared by polymerizing the above-mentioned polymers in the presence of cationic polyvinyl alcohol to distribute polyvinyl alcohol on the surfaces of the polymers; products prepared by polymerizing the above-mentioned polymers in suspended dispersion liquids of cationic colloidal particles to distribute the cationic colloidal particles on the surfaces of the polymers; aqueous binders of thermosetting synthetic resins such as a melamine resin and a urea resin; polymer resins and copolymer resins of methacrylic acid esters and acrylic acid esters, such as polymethyl methacrylate; and synthetic resin-based binders such as polyurethane resins, unsaturated polyester resins, vinyl chloride-vinyl acetate copolymers, polyvinyl butyral, and alkyd resin. These binders may be used alone or in combination of two or more.

Among these binders, polyvinyl alcohol (PVA) and derivatives thereof may be used. Examples of the polyvinyl alcohol derivatives include cation-modified polyvinyl alcohol, anion-modified polyvinyl alcohol, silanol-modified polyvinyl alcohol, and polyvinyl acetal. PVA can be synthesized by, for example, hydrolysis (saponification) of polyvinyl acetate. The degree of saponification of PVA is preferably in the range of 80 mol % to 100 mol %, and more preferably 85 mol % to 100 mol %. The degree of saponification is a proportion of the number of moles of a hydroxyl group generated by a saponification reaction in the production of polyvinyl alcohol through saponification of polyvinyl acetate and is a value obtained in accordance with JIS-K 6726. The average degree of polymerization of PVA is preferably not less than 1,500, and more preferably from 2,000 to 5,000. The term "average degree of polymerization" herein refers to the average degree of polymerization obtained in accordance with JIS-K 6726.

In the ink-receiving layer of the recording medium of the present invention, the inorganic pigment content may be at least 5 times and at most 30 times the binder content in terms of a mass ratio.

(4) Crosslinking Agent

In the present invention, the ink-receiving layer can contain a crosslinking agent. Examples of the crosslinking agent include aldehyde compounds, melamine compounds, isocyanate compounds, zirconium compounds, amide compounds, aluminum compounds, boric acid, and salts of boric acid. These crosslinking agents can be used alone or in combination of two or more. Among these crosslinking agents, boric acid and salts of boric acid may be employed because such crosslinking agents can significantly contribute to an effect in which cracking of the ink-receiving layer can be reduced.

Examples of boric acid usable include orthoboric acid ($H_3BO_3$), metaboric acid, and hypoboric acid. Salts of boric acid may be water-soluble salts of these boric acids. Examples of such salts include alkali metal salts of boric acids, such as sodium salts and potassium salts of boric acid; alkaline earth metal salts of boric acids, such as magnesium salts and calcium salts of boric acids; and ammonium salts of boric acids. Among these, orthoboric acid may be employed in view of the temporal stability of a coating solution and an effect in which cracking is reduced.

The amount of boric acid and salts of boric acid to be used can be appropriately selected on the basis of, for example, production conditions, and the boric acid content or the boric acid salt content may be in the range of 5.0 mass % to 50.0 mass % relative to the binder content in the ink-receiving layer.

(5) Other Components

In order to uniformly disperse the inorganic pigment in a solvent such as water, a deflocculating agent can be added to a coating solution used for forming the ink-receiving layer. Acids can be used as such a deflocculating agent. Examples of acids usable as a deflocculating agent include organic acids such as acetic acid, formic acid, oxalic acid, and alkylsulfonic acids (e.g., methanesulfonic acid, ethanesulfonic acid, butanesulfonic acid, and isopropanesulfonic acid); and inorganic acids such as nitric acid, hydrochloric acid, and sulfuric acid.

The coating solution used for forming the ink-receiving layer can optionally contain a cationic polymer. In particular, in the case where silica is used as the inorganic pigment, the coating solution may contain a cationic polymer in view of the water resistance of images. Examples of the cationic polymer include quaternary ammonium salts, polyamine, alkylamine, halogenated quaternary ammonium salts, cationic urethane resins, amine-epichlorohydrin polyaddition products, dihalide-diamine polyaddition products, polyamidine, vinyl polymers, polydiallyldimethylammonium chloride, polymethacryloyloxyethyl-β-hydroxyethyldimethylammonium chloride, polyethyleneimine, polyallylamine and derivatives thereof, polyamide-polyamine resins, cationized starch, dicyandiamide formalin condensates, dimethyl-2-hydroxypropylammonium salt polymers, polyamidine, polyvinylamine, dicyan-based cationic resins, polyamine cationic resins, epichlorohydrin-dimethylamine addition polymers, dimethyldiallylammonium chloride-$SO_2$ copolymers, diallylamine salt-$SO_2$ copolymers, polymers containing (meth)acrylate having a quaternary ammonium salt-substituted alkyl group at the ester moiety, styryl-type polymers having a quaternary ammonium salt-substituted alkyl group, polyamide resins, polyamide-epichlorohydrin resins, and polyamidepolyamine-epichlorohydrin resins.

In the present invention, the ink-receiving layer may further contain other additives. Examples of such additives include thickeners, pH adjusters, lubricants, liquidity modifiers, surfactants, antifoaming agents, water resistant additives, foam inhibitors, mold-releasing agents, foaming agents, penetrating agents, coloring dyes, fluorescent brightening agents, ultraviolet absorbers, antioxidants, and antiseptic agents.

Substrate

The substrate used in the present invention may be made of paper such as cast-coated paper, baryta paper, or resin-coated paper (paper having a surface coated with a resin such as a polyolefin). Furthermore, transparent thermoplastic films formed of the following resins may be employed: polyethylene, polypropylene, polyester, polylactic acid, polystyrene, polyacetate, polyvinyl chloride, cellulose acetate, polyethylene terephthalate, polymethyl methacrylate, or polycarbonate. In addition, the following material may be used: appropriately sized paper, unsized paper, coated paper, or a sheet-shaped material (e.g., synthetic paper) made of a film opacified by addition of an inorganic substance or fine foaming. Furthermore, a sheet of glass or metal may be employed. Furthermore, in order to enhance the adhesion strength between the substrate and the layer formed thereon, the surface of the substrate may be subjected to, for instance, corona discharge treatment or formation of a variety of undercoats. In view of the glossy finish of the recording medium, resin-coated paper may be employed for the substrate.

Method for Producing Recording Medium

The recording medium of the present invention can be produced by any method, and a method for producing the recording medium may include a process in which a coating solution used for forming the ink-receiving layer is applied to the substrate. A method for producing the recording medium will now be described.

Process for Forming Substrate

The substrate of the recoding medium of the present invention can be produced by methods generally used for producing paper. Examples of paper machines include Fourdrinier paper machines, cylinder paper machines, drum papermaking machines, and twin-wire papermaking machines.

In the recording medium of the present invention, a porous material, such as precipitated calcium carbonate, heavy calcium carbonate, alumina, silica, or silicate, may be applied to a substrate by size press that is generally employed in production of paper. Any common application technique can be used for the application of a porous material. Specific examples of such a technique include techniques involving a gate roll coater, size press, a bar coater, a blade coater, an air-knife coater, a roll coater, a blush coater, a curtain coater, a gravure coater, and spray equipment. The resulting substrate may be subjected to calender treatment, thermal calender treatment, or super calender treatment to smoothen the surface thereof.

Process for Forming Ink-Receiving Layer

In the recording medium of the present invention, although the ink-receiving layer can be formed on the substrate by any process, any of the following two processes may be employed. In the first process, a coating solution used for forming the ink-receiving layer is prepared from a composite compound, an inorganic pigment, and a binder and then applied to the substrate. In the second method, a coating solution used for forming the ink-receiving layer is prepared from an inorganic pigment and a binder and then applied to the substrate, and a coating solution prepared from a composite compound is subsequently applied to the resulting substrate. Any of the application techniques mentioned in "Process for Forming Substrate" can be employed. The amount of the coating solution to be applied may be from 5 g/m² to 45 g/m² on a dry solid content basis. At an amount of not less than 5 g/m², the fixing properties of ink can be further enhanced. At an amount of not more than 45 g/m², occurrence of cracking can be reduced. After formation of the ink-receiving layer, the surface of the recording medium can be subjected to calender treatment, thermal calender treatment, or super calender treatment to smoothen the surface thereof.

EXAMPLES

The present invention will now be described further in detail with reference to Examples and Comparative Examples. The present invention is not limited to Examples within the scope of the present invention.
Production of Recording Medium

Example 1

To 20 g of ion-exchanged water, 6.099 g of magnesium chloride hexahydrate was added as a Group 2 or 3 element compound, 5.098 g of polyaluminum chloride was subsequently added as an aluminum compound to the solution, and then the resulting solution was stirred with a homomixer T. K. ROBOMIX (manufactured by PRIMIX Corporation) to prepare an aqueous solution in which magnesium chloride hexahydrate and polyaluminum chloride were dissolved. Then, 7.935 g of N-2-(aminoethyl)-3-aminopropyltriethoxysilane (KBE-603, manufactured by Shin-Etsu Chemical Co., Ltd.) was gradually added as a silane coupling agent to the aqueous solution. The mixture was subsequently stirred for 5 hours to induce hydrolysis and a condensation reaction of the silane coupling agent, thereby producing a suspension containing a composite compound which contained magnesium, aluminum, and silicon.

A dispersion liquid was prepared by adding 1.2 g of methanesulfonic acid and 100 g of alumina hydrate (Disperal HP14, manufactured by Sasol Limited) as an inorganic pigment to 350 g of ion-exchanged water, and 3.262 g of the composite compound-containing suspension prepared as described above was added to the dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 1.

Then, polyvinyl alcohol PVA235 (manufactured by KURARAY CO., LTD., degree of polymerization: 3,500, degree of saponification: 88%) was dissolved as a binder in ion-exchanged water to produce an aqueous PVA solution having a solid content concentration of 8.0 mass %. The pigment dispersion 1 prepared as described above was mixed with the aqueous PVA solution such that the solid content of PVA was 10 mass % relative to 100 mass % of the solid content of alumina hydrate. To the mixture, 3.0 mass % of an aqueous boric acid solution was added such that the solid content of boric acid was 1.5 mass % relative to 100 mass % of the solid content of alumina hydrate. Through this process, a coating solution was produced.

The coating solution was applied to one surface of a 100 μm-thick polyethylene terephthalate (PET) film (Melinex 705, manufactured by Teijin DuPont Films Japan Limited) as a substrate and then dried at 110° C. to produce a recording medium having an ink-receiving layer containing the composite compound. The amount of the coating solution applied to the ink-receiving layer was 35 g/m² in the dried state. In the composite compound, the ratio of the number of magnesium atoms to the number of silicon atoms (Mg/Si) and the ratio of the number of aluminum atoms to the number of silicon atoms (Al/Si) were calculated by ICP-OES, and each ratio was 1.

Figure 2:
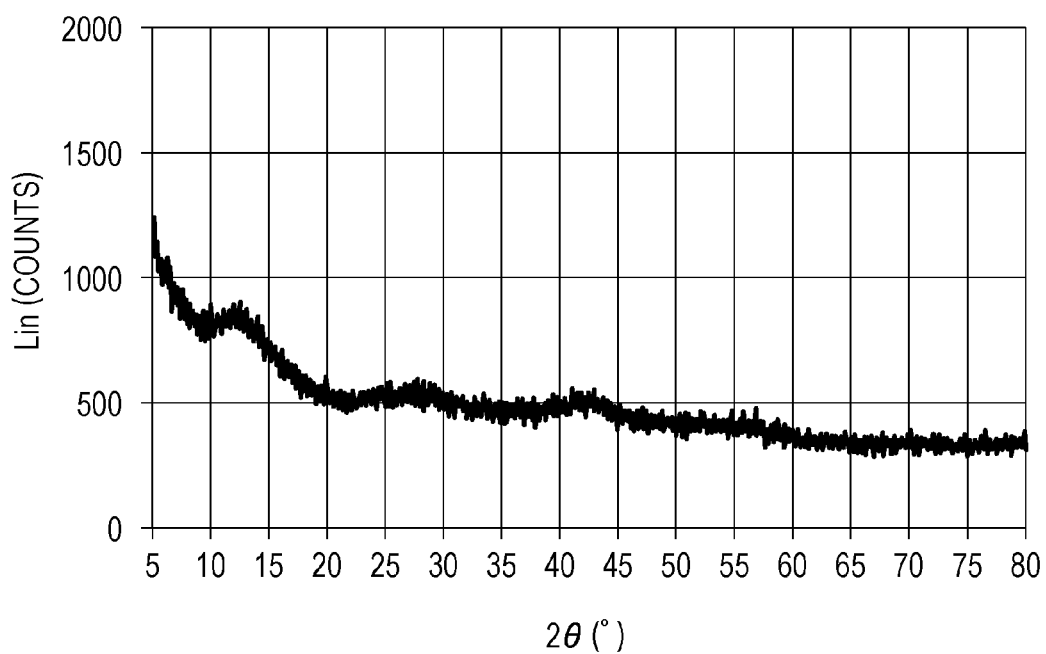
FIG. 2 illustrates an X-ray diffraction (XRD) chart of an example of a composite compound used in the present invention.

Part of the composite compound-containing suspension which had been produced in the production of the recording medium was solidified by being dried at 110° C. and then ground with a mortar to produce powder containing the composite compound. The powder was analyzed with X-ray diffractometry (XRD). FIG. 2 is an XRD chart obtained through the analysis. In the XRD analysis, an X-ray diffractometer D8 ADVANCE (manufactured by Bruker AXS K.K.) utilizing a Cu—Kα ray was used. The diffraction pattern was obtained by continuous scanning in which data was taken at 2θ=10° to 80°, a sweep rate of 2°/min, and recording at each 2θ=0.02°. As is clear from FIG. 2, no diffraction peaks of a magnesium salt and an aluminum salt, such as magnesium chloride hexahydrate and polyaluminum chloride used as the raw materials, were detected. Instead, broad peaks were observed at 27°, 40°, and 57°, which indicates that a composite compound having an amorphous structure and containing magnesium, aluminum, and silicon was obtained. In other words, the composite compound had siloxane bonds with magnesium and aluminum incorporated thereinto (namely, —Si—O—Mg—O—Si— structure and —Si—O—Al—O—Si— structure).

Example 2

A suspension containing a composite compound which contained magnesium, aluminum, and silicon was produced as in Example 1. Then, 100 g of an alumina hydrate Disperal HP14 as an inorganic pigment was added to 670 g of ion-exchanged water to prepare a dispersion liquid, and the dispersion liquid was stirred with a homomixer. Then, 3.262 g of the composite compound-containing suspension was added to the dispersion liquid while the dispersion liquid was kept being stirred, and the stirring was further carried out for an hour. The resulting dispersion liquid was dried with a spray drier to produce an alumina hydrate subjected to a surface treatment with the composite compound containing magnesium, aluminum, and silicon. The heating temperature was 170° C.

Then, 0.72 g of methanesulfonic acid and 60 g of the surface-treated alumina hydrate were added to 210 g of ion-exchanged water, and the mixture was stirred with a homomixer. Then, ion-exchanged water and methanesulfonic acid were added to the resulting mixture to adjust the pH and solid content concentration thereof to be 4.2 and 20 mass %, respectively, thereby producing a pigment dispersion 2.

Except that the pigment dispersion 2 produced in this manner was used in place of the pigment dispersion 1, a recording medium having an ink-receiving layer containing the alumina hydrate, PVA, and the composite compound containing magnesium, aluminum, and silicon was produced as in Example 1. In the composite compound, the ratio of the number of magnesium atoms to the number of silicon atoms (Mg/Si) and the ratio of the number of aluminum atoms to the number of silicon atoms (Al/Si) were calculated by ICP-OES, and each ratio was 1. The pigment dispersion 2 was analyzed with XPS, and it was found that the peak positions in the 2p orbital spectrum and 2s orbital spectrum of the aluminum atom constituting the alumina hydrate each shifted to the lower energy side as compared with the peak positions in the 2p orbital spectrum and the 2s orbital spectrum of the aluminum atom before the surface treatment. This result showed that the pigment contained in the pigment dispersion 2 had been surface-treated with the composite compound.

Example 3

In a state in which 20 g of ion-exchanged water was stirred with a homomixer T. K. ROBOMIX, 6.642 g of 3-aminopropyltriethoxysilane (KBE-903, manufactured by Shin-Etsu Chemical Co., Ltd.) as a silane coupling agent was gradually added dropwise to the ion-exchanged water to produce an aqueous solution containing the silane coupling agent. To this aqueous solution, an aqueous solution prepared by dissolving 6.441 g of strontium acetate hemihydrate as a Group 2 or 3 element compound in 15 g of ion-exchanged water was added dropwise, and the mixture was stirred for 5 hours to produce a suspension containing a composite compound derived from the silane coupling agent and strontium acetate hemihydrate. An aqueous solution prepared by dissolving 1.699 g of polyaluminum chloride as an aluminum compound in 15 g of ion exchanged water was added to the suspension, and the mixture was stirred for 5 hours to produce a suspension containing a composite compound which contained strontium, aluminum, and silicon. The resulting compound was analyzed to obtain an XRD chart, and the XRD chart showed that the compound had siloxane bonds with strontium and aluminum incorporated thereinto (namely, —Si—O—Sr—O—Si— structure and —Si—O—Al—O—Si— structure).

Then, 100 g of an alumina hydrate Disperal HP14 was added as an inorganic pigment to 670 g of ion-exchanged water to prepare a dispersion liquid, and the dispersion liquid was stirred with a homomixer. Then, 18.001 g of the composite compound-containing suspension was added to the dispersion liquid while the dispersion liquid was kept being stirred, and the stirring was further carried out for an hour. The resulting dispersion liquid was dried with a spray drier to produce an alumina hydrate subjected to a surface treatment with the composite compound containing strontium, aluminum, and silicon. The heating temperature was 170° C.

Then, 0.72 g of methanesulfonic acid and 60 g of the surface-treated alumina hydrate were added to 210 g of ion-exchanged water, and the mixture was stirred with a homomixer. Then, ion-exchanged water and methanesulfonic acid were added to the resulting mixture to adjust the pH and solid content concentration thereof to be 4.2 and 20 mass %, respectively, thereby producing a pigment dispersion 3.

Except that the pigment dispersion 3 produced in this manner was used in place of the pigment dispersion 1, a recording medium having an ink-receiving layer containing the alumina hydrate, PVA, and the composite compound containing strontium, aluminum, and silicon was produced as in Example 1. In the composite compound, the ratio of the number of strontium atoms to the number of silicon atoms (Sr/Si) and the ratio of the number of aluminum atoms to the number of silicon atoms (Al/Si) were calculated by ICP-OES; the former was 1, and the latter was 0.3.

Example 4

To 30 g of ion-exchanged water, 5.146 g of lanthanum acetate sesquihydrate was added as a Group 2 or 3 element compound, 5.132 g of aluminum sulfate was subsequently added thereto as an aluminum compound, and then the solution was stirred with a homomixer T. K. ROBOMIX to produce an aqueous solution in which lanthanum acetate sesquihydrate and aluminum sulfate were dissolved. Then, 6.642 g of 3-aminopropyltriethoxysilane KBE-903 was gradually added as a silane coupling agent to the aqueous solution. Then, the resulting solution was stirred for 5 hours to induce hydrolysis and a condensation reaction of the silane coupling agent, thereby producing a suspension containing a composite compound which contained lanthanum, aluminum, and silicon. The resulting compound was analyzed to obtain an XRD chart, and the XRD chart showed that the compound had a siloxane bonds with lanthanum and aluminum incorporated thereinto (namely, —Si—O—La—O—Si— structure and —Si—O—Al—O—Si— structure).

Then, 100 g of an alumina hydrate Disperal HP14 was added as an inorganic pigment to 670 g of ion-exchanged water to prepare a dispersion liquid, and the dispersion liquid was stirred with a homomixer. Then, 10.430 g of the composite compound-containing suspension was added to the dispersion liquid while the dispersion liquid was kept being stirred, and the stirring was further carried out for an hour. The resulting dispersion liquid was dried with a spray drier to produce an alumina hydrate subjected to a surface treatment with the composite compound containing lanthanum, aluminum, and silicon. The heating temperature was 170° C.

Then, 0.72 g of methanesulfonic acid and 60 g of the surface-treated alumina hydrate were added to 210 g of ion-exchanged water, and the mixture was stirred with a homomixer. Then, ion-exchanged water and methanesulfonic acid were added to the resulting mixture to adjust the pH and solid content concentration thereof to be 4.2 and 20 mass %, respectively, thereby producing a pigment dispersion 4.

Except that the pigment dispersion 4 produced in this manner was used in place of the pigment dispersion 1, a recording medium having an ink-receiving layer containing the alumina hydrate, PVA, and the composite compound containing lanthanum, aluminum, and silicon was produced as in Example 1. In the composite compound, the ratio of the number of lanthanum atoms to the number of silicon atoms (La/Si) and the ratio of the number of aluminum atoms to the number of silicon atoms (Al/Si) were calculated by ICP-OES, and each ratio was 1.

Example 5

An yttrium oxide sol was used as a sol containing a Group 2 or 3 element compound, and aluminum nitrate nonahydrate was used as an aluminum compound. The yttrium oxide sol contained ion-exchanged water and 10 mass % of yttrium oxide dispersed therein, and the yttrium oxide in the sol had an average particle size of 100 nm, the average particle size being measured by a Zeta-potential & Particle-size Analyzer ELSZ-2 (manufactured by Otsuka Electronics Co., Ltd.). To 45.162 g of the yttrium oxide sol, 7.503 g of aluminum nitrate nonahydrate was added. In a state in which the mixture was stirred with a homomixer T. K. ROBOMIX, 3.928 g of 3-mercaptopropyltrimethoxysilane (KBM-803, manufactured by Shin-Etsu Chemical Co., Ltd.) as a silane coupling agent was gradually added to that mixture. The resulting mixture was further stirred for five hours to yield a suspension containing a composite compound which contained yttrium, aluminum, and silicon. The resulting compound was analyzed to obtain an XRD chart, and the XRD chart showed that the compound had siloxane bonds with yttrium and aluminum incorporated thereinto (namely, —Si—O—Y—O—Si— structure and —Si—O—Al—O—Si— structure).

Then, a dispersion liquid was prepared by adding 1.2 g of methanesulfonic acid and 100 g of an alumina hydrate Disperal HP14 as an inorganic pigment to 350 g of ion-exchanged water, and 47.176 g of the composite compound-containing suspension was added to the dispersion liquid while the dispersion liquid was stirred with a homomixer.

Ion-exchanged water and methanesulfonic acid were further added to the resulting dispersion liquid to adjust the pH and solid content concentration thereof to be 4.2 and 20 mass %, respectively, thereby producing a pigment dispersion 5.

Except that the pigment dispersion 5 produced in this manner was used in place of the pigment dispersion 1, a recording medium having an ink-receiving layer containing the alumina hydrate, PVA, and the composite compound containing yttrium, aluminum, and silicon was produced as in Example 1. In the composite compound, the ratio of the number of yttrium atoms to the number of silicon atoms (Y/Si) and the ratio of the number of aluminum atoms to the number of silicon atoms (Al/Si) were calculated by ICP-OES, and each ratio was 1.

Example 6

A cerium oxide sol was used as a sol containing a Group 2 or 3 element compound, and aluminum chloride hexahydrate was used as an aluminum compound. The cerium oxide sol contained ion-exchanged water and 10 mass % of cerium oxide dispersed therein, and the cerium oxide in the sol had an average particle size of 8 nm, the average particle size being measured by a Zeta-potential & Particle-size Analyzer ELSZ-2. To 68.844 g of the cerium oxide sol, 7.243 g of aluminum chloride hexahydrate was added. In a state in which the mixture was stirred with a homomixer T. K. ROBOMIX, 9.452 g of 3-glycidoxypropyltrimethoxysilane (KBM-403, manufactured by Shin-Etsu Chemical Co., Ltd.) as a silane coupling agent was gradually added to that mixture. The resulting mixture was further stirred for five hours to yield a suspension containing a composite compound which contained cerium, aluminum, and silicon. The resulting compound was analyzed to obtain an XRD chart, and the XRD chart showed that the compound had siloxane bonds with cerium and aluminum incorporated thereinto (namely, —Si—O—Ce—O—Si— structure and —Si—O—Al—O—Si— structure).

Then, a dispersion liquid was prepared by adding 1.2 g of methanesulfonic acid and 100 g of an alumina hydrate Disperal HP14 (manufactured by Sasol Limited) as an inorganic pigment to 320 g of ion-exchanged water, and 71.306 g of the composite compound-containing suspension was added to the dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 6.

Except that the pigment dispersion 6 produced in this manner was used in place of the pigment dispersion 1, a recording medium having an ink-receiving layer containing the alumina hydrate, PVA, and the composite compound containing cerium, aluminum, and silicon was produced as in Example 1. In the composite compound, the ratio of the number of cerium atoms to the number of silicon atoms (Ce/Si) and the ratio of the number of aluminum atoms to the number of silicon atoms (Al/Si) were calculated by ICP-OES; the former was 1, and the latter was 0.8.

Example 7

To 20 g of ion-exchanged water, 7.085 g of calcium nitrate tetrahydrate was added as a Group 2 or 3 element compound, 5.098 g of polyaluminum chloride was subsequently added as an aluminum compound to the solution, and then the resulting solution was stirred with a homomixer T. K. ROBOMIX to prepare an aqueous solution in which calcium nitrate tetrahydrate and polyaluminum chloride were dissolved. Then, 7.935 g of N-2-(aminoethyl)-3-aminopropyltriethoxysilane (KBE-603) as a silane coupling agent was gradually added to the aqueous solution. The mixture was subsequently stirred for five hours to induce hydrolysis and a condensation reaction of the silane coupling agent, thereby producing a suspension containing a composite compound which contained calcium, aluminum, and silicon. The resulting compound was analyzed to obtain an XRD chart, and the XRD chart showed that the compound had siloxane bonds with calcium and aluminum incorporated thereinto (namely, —Si—O—Ca—O—Si— structure and —Si—O—Al—O—Si— structure).

Then, 250 g of ion-exchanged water was mixed with 30 g of an inorganic pigment (gas-phase silica, AEROSIL 380, manufactured by Nippon Aerosil Co., Ltd.) and 1.2 g of a cationic polymer (dimethyldiallylammonium chloride homopolymer, SHALLOL DC902P, manufactured by Daiichi Kogyo Seiyaku Co., Ltd.), and the mixture was processed with a planetary ball mill P-6 (manufactured by Fritsch GmbH) and zirconium beads having a particle size of 5 mm at 200 rpm for 5 minutes, thereby yielding a silica particle dispersion.

To the silica particle dispersion, 1.002 g of the composite compound-containing suspension was added; and ion-exchanged water was further added thereto to adjust the solid content concentration to be 10 mass %. The product was processed with a planetary ball mill P-6 and zirconium beads having a particle size of 5 mm at 200 rpm for 5 minutes, thereby producing a pigment dispersion 7.

Then, polyvinyl alcohol PVA235 (degree of polymerization: 3,500, degree of saponification: 88%) was dissolved in ion-exchanged water to produce an aqueous PVA solution having a solid content concentration of 8.0 mass %. The pigment dispersion 7 prepared as described above was mixed with the aqueous PVA solution such that the solid content of the PVA was 20 mass % relative to 100 mass % of the solid content of the gas-phase silica. To the mixture, 3.0 mass % of an aqueous boric acid solution was added such that the solid content of boric acid was 4.0 mass % relative to 100 mass % of the solid content of the gas-phase silica, thereby producing a coating solution.

The coating solution was applied to one surface of a 100 μm-thick PET film Melinex 705 as a substrate and then heated at 110° C. to produce a recording medium having an ink-receiving layer containing silica, PVA, and the composite compound containing calcium, aluminum, and silicon. The amount of the coating solution applied to the ink-receiving layer was 30 g/m$^2$ in the dried state. In the composite compound, the ratio of the number of calcium atoms to the number of silicon atoms (Ca/Si) and the ratio of the number of aluminum atoms to the number of silicon atoms (Al/Si) were calculated by ICP-OES, and each ratio was 1.

Example 8

A suspension containing a composite compound which contained cerium, aluminum, and silicon was prepared as in Example 6. Then, a dispersion liquid was prepared by adding 1.2 g of methanesulfonic acid and 100 g of an alumina hydrate Disperal HP14 as an inorganic pigment to 280 g of ion-exchanged water, and 100 g of the composite compound-containing suspension was added to the dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 14.

Except that the pigment dispersion 14 produced in this manner was used in place of the pigment dispersion 1, a recording medium having an ink-receiving layer containing the alumina hydrate, PVA, and the composite compound containing cerium, aluminum, and silicon was produced as in Example 1. In the composite compound, the ratio of the number of cerium atoms to the number of silicon atoms (Ce/Si) and the ratio of the number of aluminum atoms to the number of silicon atoms (Al/Si) were calculated by ICP-OES; the former was 1, and the latter was 0.8.

Comparative Example 1

To 350 g of ion-exchanged water, 1.2 g of methanesulfonic acid and 100 g of an alumina hydrate Disperal HP14 as an inorganic pigment were added, and the solution was stirred with a homomixer. Then, ion-exchanged water and methanesulfonic acid were further added to the resulting solution to adjust the pH and solid content concentration thereof to be 4.2 and 20 mass %, respectively, thereby producing a pigment dispersion 8.

Except that the pigment dispersion 8 produced in this manner was used in place of the pigment dispersion 1, recording medium having an ink-receiving layer that was free from a composite compound containing a Group 2 or 3 element, aluminum, and silicon was produced as in Example 1.

Comparative Example 2

To 20 g of ion-exchanged water, 7.935 g of N-2-(aminoethyl)-3-aminopropyltriethoxysilane (KBE-603) as a silane coupling agent was gradually added. The solution was subsequently stirred for 5 hours to induce hydrolysis and a condensation reaction of the silane coupling agent.

Then, 100 g of an alumina hydrate Disperal HP14 as an inorganic pigment was added to 670 g of ion-exchanged water to prepare a dispersion liquid, and the dispersion liquid was stirred with a homomixer. Then, 2.329 g of the solution which had undergone the hydrolysis and condensation reaction of the silane coupling agent was added to the dispersion liquid while the dispersion liquid was kept being stirred, and the stirring was further carried out for an hour. The resulting dispersion liquid was dried with a spray drier to produce an alumina hydrate subjected to a surface treatment with the silane coupling agent. The heating temperature was 170° C.

Then, 0.72 g of methanesulfonic acid and 60 g of the surface-treated alumina hydrate were added to 210 g of ion-exchanged water, and this solution was stirred with a homomixer. Then, 0.305 g of magnesium chloride hexahydrate and 0.255 g of polyaluminum chloride were added to the resulting solution, and this mixture was stirred for 30 minutes. Ion-exchanged water and methanesulfonic acid were subsequently added to the resulting mixture to adjust the pH and solid content concentration thereof to be 4.2 and 20 mass %, respectively, thereby producing a pigment dispersion 9.

Except that the pigment dispersion 9 produced in this manner was used in place of the pigment dispersion 1, a recording medium was produced as in Example 1. In the ink-receiving layer, the ratio of the number of magnesium atoms to the number of silicon atoms (Mg/Si) was calculated by ICP-OES; the ratio was 1.

Comparative Example 3

To 350 g of ion-exchanged water, 1.2 g of methanesulfonic acid and 100 g of an alumina hydrate Disperal HP14 as an inorganic pigment were added, and the solution was stirred with a homomixer. Then, 0.508 g of magnesium chloride hexahydrate and 0.425 g of polyaluminum chloride were added to the resulting solution, and this mixture was stirred for 30 minutes. Ion-exchanged water and methanesulfonic acid were subsequently added to the resulting mixture to adjust the pH and solid content concentration thereof to be 4.2 and 20 mass %, respectively, thereby producing a pigment dispersion 10.

A recording medium was produced as in Example 1 except that the pigment dispersion 10 produced in this manner was used in place of the pigment dispersion 1.

Comparative Example 4

In order to produce a silica particle dispersion, 250 g of ion-exchanged water was mixed with 30 g of an inorganic pigment (gas-phase silica, AEROSIL 380) and 1.2 g of a cationic polymer (dimethyldiallylammonium chloride homopolymer, SHALLOL DC902P), and the mixture was processed with a planetary ball mill P-6 and zirconium beads having a particle size of 5 mm at 200 rpm for 5 minutes.

Ion-exchanged water was added to the silica particle dispersion produced in this manner to adjust the solid content concentration to be 10 mass %, thereby yielding a pigment dispersion 11. A recording medium was produced as in Example 7 except that the pigment dispersion 11 was used in place of the pigment dispersion 7. In other words, a recording medium having an ink-receiving layer that was free from a composite compound containing a Group 2 or 3 element, aluminum, and silicon was produced.

Comparative Example 5

In a state in which 42.67 g of ion-exchanged water was stirred with a homomixer T. K. ROBOMIX, 10.67 g of 3-aminopropyltrimethoxysilane (KBM-903, manufactured by Shin-Etsu Chemical Co., Ltd.) as a silane coupling agent was gradually added dropwise to the ion-exchanged water. Then, 22.22 g of an aqueous solution of 20% lactic acid was added to the product, and this mixture was stirred for 10 minutes. Then, an aqueous solution prepared by dissolving 7.18 g of zirconium oxychloride octahydrate in 28.37 g of ion-exchanged water was added to the resulting mixture, and this mixture was heated at 50° C. for 2 hours while being stirred, thereby yielding a suspension containing a composite compound derived from the silane coupling agent and zirconium oxychloride octahydrate.

A dispersion liquid was prepared by adding 1.2 g of methanesulfonic acid and 100 g of an alumina hydrate Disperal HP14 (manufactured by Sasol Limited) as an inorganic pigment to 350 g of ion-exchanged water, and 10.81 g of the composite compound-containing suspension prepared as described above was added to the dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 12.

A recording medium was produced as in Example 1 except that the pigment dispersion 12 was used in place of the pigment dispersion 1. In the composite compound, the ratio of the number of zirconium atoms to the number of silicon atoms (Zr/Si) was calculated by ICP-OES; and the ratio was 0.7.

Comparative Example 6

An aqueous magnesium acetate solution was prepared by adding 1.07 g of magnesium acetate tetrahydrate as a Group 2 or 3 element compound to 30 g of ion-exchanged water and then stirring this solution with a homomixer T. K. ROBOMIX (manufactured by PRIMIX Corporation). Then, 0.44 g of 3-aminopropyltriethoxysilane (KBE-903 manufactured by Shin-Etsu Chemical Co., Ltd.) as a silane coupling agent was gradually added to the aqueous solution. This mixture was subsequently stirred for 5 hours to induce hydrolysis and a condensation reaction of the silane coupling agent, thereby producing a suspension containing a composite compound which contained magnesium and silicon.

A dispersion liquid was prepared by adding 0.72 g of methanesulfonic acid and 60 g of an alumina hydrate Disperal HP14 (manufactured by Sasol Limited) as an inorganic pigment to 220 g of ion-exchanged water, and 3.262 g of the composite compound-containing suspension prepared as described above was added to the dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 13.

A recording medium was produced as in Example 1 except that the pigment dispersion 13 was used in place of the pigment dispersion 1. In the composite compound, the ratio of the number of magnesium atoms to the number of silicon atoms (Mg/Si) was calculated by ICP-OES; the ratio was 2.5.

Comparative Example 7

To 50 g of ion-exchanged water, 10 g of aluminum chloride hexahydrate was added as an aluminum compound, and then this solution was stirred with a homomixer T. K. ROBOMIX (manufactured by PRIMIX Corporation) to prepare an aqueous aluminum chloride solution. Then, 13.2 g of N-2-(aminoethyl)-3-aminopropyltriethoxysilane (KBE-603, manufactured by Shin-Etsu Chemical Co., Ltd.) was gradually added as a silane coupling agent to the aqueous solution. This mixture was stirred for 15 minutes to induce hydrolysis and a condensation reaction of the silane coupling agent, thereby producing a suspension containing a composite compound which contained aluminum and silicon.

A dispersion liquid was prepared by adding 0.72 g of methanesulfonic acid and 60 g of an alumina hydrate Disperal HP14 (manufactured by Sasol Limited) as an inorganic pigment to 200 g of ion-exchanged water, and 20 g of the composite compound-containing suspension prepared as described above was added to this dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 15.

A recording medium was produced as in Example 1 except that the pigment dispersion 15 was used in place of the pigment dispersion 1. In the composite compound, the ratio of the number of aluminum atoms to the number of silicon atoms (Al/Si) was calculated by ICP-OES; and the ratio was 0.8.

Comparative Example 8

A suspension containing a composite compound which contained cerium, aluminum, and silicon was prepared as in Example 6. Then, a dispersion liquid was prepared by adding 1.2 g of methanesulfonic acid and 100 g of an alumina hydrate Disperal HP14 as an inorganic pigment to 200 g of ion-exchanged water, and 190 g of the composite compound-containing suspension prepared as described above was added to this dispersion liquid while the dispersion liquid was stirred with a homomixer. Ion-exchanged water and methanesulfonic acid were further added to the resulting dispersion liquid to adjust the pH and solid content concentration thereof to be 4.2 and 20 mass %, respectively, thereby producing a pigment dispersion 16.

Except that the pigment dispersion 16 produced in this manner was used in place of the pigment dispersion 1, a recording medium having an ink-receiving layer containing the alumina hydrate, PVA, and the composite compound containing cerium, aluminum, and silicon was produced as in Example 1. In the composite compound, the ratio of the number of cerium atoms to the number of silicon atoms (Ce/Si) and the ratio of the number of aluminum atoms to the number of silicon atoms (Al/Si) were calculated by ICP-OES; the former was 1, and the latter was 0.8.

Comparative Example 9

A coating solution used for forming an ink-receiving layer was prepared in accordance with the description in Example 1 of Japanese Patent Laid-Open No. 2011-201147, and a recording medium was produced with this coating solution.

Comparative Example 10

Aluminum-containing magnesium phyllosilicate was prepared in accordance with the description in Example 2 of Japanese Patent Laid-Open No. 61-116579.

Comparative Example 11

A silica-based material containing a composite oxide which contained silicon-aluminum-nickel-magnesium was prepared in accordance with the description in Example 1 of Japanese Patent Laid-Open No. 2010-222151.

Then, 250 g of ion-exchanged water was mixed with 30 g of an inorganic pigment (gas-phase silica, AEROSIL 380, manufactured by Nippon Aerosil Co., Ltd.) and 1.2 g of a cationic polymer (dimethyldiallylammonium chloride homopolymer, SHALLOL DC902P, manufactured by Daiichi Kogyo Seiyaku Co., Ltd.), and the mixture was processed with a planetary ball mill P-6 (manufactured by Fritsch GmbH) and zirconium beads having a particle size of 5 mm at 200 rpm for 5 minutes, thereby yielding a silica particle dispersion.

To the silica particle dispersion, 3 g of the silica-based composite compound was added; and ion-exchanged water was further added thereto to adjust the solid content concentration to be 10 mass %. The product was processed with a planetary ball mill P-6 and zirconium beads having a particle size of 5 mm at 200 rpm for 5 minutes, thereby producing a pigment dispersion 18. Except that the pigment dispersion 18 was used in place of the pigment dispersion 7, a recording medium was produced as in Example 7. In other words, a recording medium having an ink-receiving layer containing the composite oxide which contained silicon-aluminum-nickel-magnesium was produced.

Comparative Example 12

A silica-alumina-magnesia composite material was produced in accordance with the description in Example 1 of Japanese Patent Laid-Open No. 2000-154017.

Then, 250 g of ion-exchanged water was mixed with 30 g of an inorganic pigment (gas-phase silica, AEROSIL 380, manufactured by Nippon Aerosil Co., Ltd.) and 1.2 g of a cationic polymer (dimethyldiallylammonium chloride homopolymer, SHALLOL DC902P, manufactured by Daiichi Kogyo Seiyaku Co., Ltd.), and the mixture was processed with a planetary ball mill P-6 (manufactured by Fritsch GmbH) and zirconium beads having a particle size of 5 mm at 200 rpm for 5 minutes, thereby yielding a silica particle dispersion.

To the silica particle dispersion, 3 g of the silica-alumina-magnesia composite material was added; and ion-exchanged water was further added thereto to adjust the solid content concentration to be 10 mass %. The product was processed with a planetary ball mill P-6 and zirconium beads having a particle size of 5 mm at 200 rpm for 5 minutes, thereby producing a pigment dispersion 19. Except that the pigment dispersion 19 was used in place of the pigment dispersion 7, a recording medium was produced as in Example 7. In other words, a recording medium having an ink-receiving layer containing the silica-alumina-magnesia composite material was produced.

TABLE 1

Composition of Recording Medium

| Examples and Comparative Examples No. | Inorganic pigment | Composite compound |  |  |
|---|---|---|---|---|
|  |  | Group 2 or 3 element | Aluminum compound, zirconium compound | Silane coupling agent, silica, water glass |
| Example 1 | Alumina hydrate | $MgCl_2 \cdot 6H_2O$ | $[Al_2(OH)_nCl_{6-n}]_m$ | N-2-(aminoethyl)-3-aminopropyltriethoxysilane |
| Example 2 | Alumina hydrate | $MgCl_2 \cdot 6H_2O$ | $[Al_2(OH)_nCl_{6-n}]_m$ | N-2-(aminoethyl)-3-aminopropyltriethoxysilane |
| Example 3 | Alumina hydrate | $Sr(CH_3COO)_2 \cdot 0.5H_2O$ | $[Al_2(OH)_nCl_{6-n}]_m$ | 3-aminopropyltriethoxysilane |
| Example 4 | Alumina hydrate | $La(CH_3COO)_2 \cdot 1.5H_2O$ | $Al_2(SO_4)_3$ | 3-aminopropyltriethoxysilane |
| Example 5 | Alumina hydrate | $Y_2O_3$ | $Al(NO_3)_3 \cdot 9H_2O$ | 3-mercaptopropyltrimethoxysilane |
| Example 6 | Alumina hydrate | $CeO_2$ | $AlCl_3 \cdot 6H_2O$ | 3-glycidoxypropyltrimethoxysilane |
| Example 7 | Gas-phase silica | $Ca(NO_3)_2 \cdot 4H_2O$ | $[Al_2(OH)_nCl_{6-n}]_m$ | N-2-(aminoethyl)-3-aminopropyltriethoxysilane |
| Example 8 | Alumina hydrate | $CeO_2$ | $AlCl_3 \cdot 6H_2O$ | 3-glycidoxypropyltrimethoxysilane |
| Comparative Example 1 | Alumina hydrate | — | — | — |
| Comparative Example 2 | Alumina hydrate | — | — | N-2-(aminoethyl)-3-aminopropyltriethoxysilane |
| Comparative Example 3 | Alumina hydrate | — | — | — |
| Comparative Example 4 | Gas-phase silica | — | — | — |
| Comparative Example 5 | Alumina hydrate | — | $ZrOCl_2 \cdot 8H_2O$ | 3-aminopropyltriethoxysilane |
| Comparative Example 6 | Alumina hydrate | $Mg(CH_3COO)_2 \cdot 4H_2O$ | — | 3-aminopropyltriethoxysilane |
| Comparative Example 7 | Alumina hydrate | — | $AlCl_3 \cdot 6H_2O$ | N-2-(aminoethyl)-3-aminopropyltriethoxysilane |
| Comparative Example 8 | Alumina hydrate | $CeO_2$ | $AlCl_3 \cdot 6H_2O$ | 3-glycidoxypropyltrimethoxysilane |
| Comparative Example 9 | Gas-phase silica | — | $AlCl_3 \cdot 6H_2O$ | Water glass |
| Comparative Example 10 | Alumina hydrate | $MgCl_2 \cdot 6H_2O$ | $AlCl_3 \cdot 6H_2O$ | Water glass |
| Comparative Example 11 | Gas-phase silica | $Mg(NO_3)_2 \cdot 6H_2O$ | $Al(NO_3)_3 \cdot 9H_2O$ | $SiO_2$ |
| Comparative Example 12 | Gas-phase silica | $Mg(NO_3)_2 \cdot 6H_2O$ | $Al(NO_3)_3 \cdot 9H_2O$ | $SiO_2$ |

| Examples and Comparative Examples No. | Metallic compound added to pigment dispersion | Composite compound content to inorganic pigment content (mass %) | Group 2 or 3 element/Si | Al/Si or Zr/Si |
|---|---|---|---|---|
| Example 1 | — | 1.6 | 1.0 | 1.0 |
| Example 2 | — | 1.6 | 1.0 | 1.0 |
| Example 3 | — | 4.1 | 1.0 | 0.3 |
| Example 4 | — | 3.8 | 0.5 | 0.5 |
| Example 5 | — | 13.3 | 1.0 | 1.0 |
| Example 6 | — | 19.7 | 1.0 | 0.8 |
| Example 7 | — | 1.7 | 1.0 | 1.0 |
| Example 8 | — | 27.6 | 1.0 | 0.8 |
| Comparative Example 1 | — | 0.0 | — | — |
| Comparative Example 2 | $MgCl_2 \cdot 6H_2O$, $[Al_2(OH)_nCl_{6-n}]_m$ | 0.7 | 0.6 | 0.6 |
| Comparative Example 3 | $MgCl_2 \cdot 6H_2O$, $[Al_2(OH)_nCl_{6-n}]_m$ | 0.0 | — | — |
| Comparative Example 4 | — | 0.0 | — | — |
| Comparative Example 5 | — | 1.7 | — | 0.7 |

TABLE 1-continued

Composition of Recording Medium

| | | | | |
|---|---|---|---|---|
| Comparative Example 6 | — | 2.5 | 2.5 | — |
| Comparative Example 7 | — | 10.6 | — | 0.8 |
| Comparative Example 8 | — | 34.4 | 1.0 | 0.8 |
| Comparative Example 9 | — | 30.7 | — | 15.0 |
| Comparative Example 10 | — | 5.0 | 1.8 | 1.0 |
| Comparative Example 11 | — | 5.0 | 0.1 | 0.1 |
| Comparative Example 12 | — | 5.0 | 0.1 | 0.2 |

Evaluation of Recording Medium

The following characteristics of the recording media produced as described above were evaluated. Images used for evaluating each characteristic were formed with an ink jet recording apparatus PIXUS iP4600 (manufactured by CANON KABUSHIKI KAISHA) to which an ink cartridge BCI-321 (manufactured by CANON KABUSHIKI KAISHA) had been attached. In the present invention, the four characteristics of each recording medium were evaluated: "color developability of image", "ozone resistance of image", "reduction in bleeding in image stored at high temperature and humidity for a long time", and "light resistance of image". A recording medium which had exhibited at least two results "A" in the evaluation of the four characteristics was determined as being good in its quality, and a recording medium which had exhibited at most one result "A" in the evaluation of four characteristics was determined as being unacceptable in its quality.

Color Developability of Image

The above-mentioned ink jet recording apparatus was used in the operation mode of "professional gloss, platinum grade, no color correction" to record a 2.5-cm-square solid black image (image of 100% Recording Duty) on each recording medium. The optical density (OD) of each recorded image was measured with an optical reflection densitometer 310TR (manufactured by X-Rite). The color developability of each image was evaluated from the obtained OD value. The larger the OD value is, the higher color developability is. The following evaluation criteria were employed. Results of the evaluation are shown in Table 2.

A: OD of not less than 2.2;
B: OD of not less than 2.1 and less than 2.2; and
C: OD of less than 2.1

Ozone Resistance of Image

An image including monochromatic patches (2.5 cm×2.5 cm) of black, cyan, magenta, and yellow was formed on each recording medium with the above-mentioned ink jet recording apparatus so as to have an OD of 1.0. Each recorded image was subjected to an ozone exposure test with an ozone weather meter OMS-HS (manufactured by Suga Test Instruments Co., Ltd.) at exposure gas composition: 2.5 vol ppm of ozone, test time: 80 hours, and temperature and humidity in the test oven: 23° C. and relative humidity 50%. The ODs of each image before and after the test were measured with a spectrophotometer Spectrolino (manufactured by GRETAG MACBETH AG), and the OD residual rate of each monochromatic patch was obtained from an expression: OD residual rate (%)=(OD after test/OD before test)×100. The OD residual rate of the cyan patch which is most strongly affected by ozone was employed from the obtained OD residual rates of the individual monochromatic patches to evaluate the ozone resistance of each image. The higher the OD residual rate is, the higher the ozone resistance of the image is. The following evaluation criteria were employed. Results of evaluation are shown in Table 2.

A: OD residual rate of the cyan patch of not less than 90%;
B: OD residual rate of the cyan patch of not less than 85% and less than 90%; and
C: OD residual rate of the cyan patch of less than 85% Reduction in Bleeding in Image Stored at High Temperature and Humidity for Long Time An image of a black patch of (R,G,B)=(0,0,0) was formed on each recording medium with the above-mentioned ink jet recording apparatus. Each formed image was left to stand at 23° C. and relative humidity 50% for 24 hours and then stored at 25° C. and relative humidity 85% for 4 weeks for a long-term storage test. After the test, bleeding around the black patch of each image was visually observed, thereby evaluating a reduction in bleeding in an image stored at high temperature and humidity for a long time. The following evaluation criteria were employed. Results of evaluation are shown in Table 2.

A: Substantially no bleeding;
B: Bleeding was found, but negligible; and
C: Obvious bleeding Light Resistance of Image Images were formed as in the evaluation of "Ozone Resistance of Image". Each image was subjected to a light exposure test with an ATLAS WEATHER-OMETER Ci 4000 (manufactured by Atlas Material Testing Technology LLC) at an illuminance of 0.39 W/m$^2$ (wavelength: 340 nm), test time: 100 hours, and temperature and humidity in the test oven: 50° C. and relative humidity 70%. The ODs of each image before and after the test were measured with a spectrophotometer Spectrolino (manufactured by GRETAG MACBETH AG), and the OD residual rate of each monochromatic patch was obtained from an expression: OD residual rate (%)=(OD after test/OD before test)×100. The OD residual rate of the magenta patch which is most strongly affected by light was employed from the OD residual rates of the individual monochromatic patches to evaluate the light resistance of each image. The higher the OD residual rate is, the higher the light resistance of the image is. The following evaluation criteria were employed. Results of the evaluation are shown in Table 2.

A: OD residual rate of the magenta patch of not less than 80%;
B: OD residual rate of the magenta patch of not less than 75% and less than 80%; and
C: OD residual rate of the magenta patch of less than 75%

TABLE 2

| Examples and Comparative Examples No. | Evaluation results ||||
|---|---|---|---|---|
| | Color developability of images | Ozone resistance of images | Reduction in bleeding in images | Light resistance of images |
| Example 1 | A | A | B | B |
| Example 2 | A | A | A | B |
| Example 3 | A | A | A | A |
| Example 4 | A | A | A | B |
| Example 5 | A | A | B | B |
| Example 6 | A | A | B | B |
| Example 7 | A | A | B | B |
| Example 8 | A | A | B | B |
| Comparative Example 1 | A | C | B | B |
| Comparative Example 2 | B | A | C | B |
| Comparative Example 3 | B | A | C | B |
| Comparative Example 4 | A | C | B | B |
| Comparative Example 5 | B | B | B | C |
| Comparative Example 6 | B | A | B | B |
| Comparative Example 7 | B | B | B | C |
| Comparative Example 8 | A | A | C | B |
| Comparative Example 9 | B | C | C | B |
| Comparative Example 10 | B | C | C | B |
| Comparative Example 11 | B | C | B | B |
| Comparative Example 12 | B | C | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129096, filed Jun. 6, 2012, which is hereby incorporated by reference herein in its entirety.

What is claimed is:

1. A recording medium comprising:
a substrate; and
an ink-receiving layer formed on at least one surface of the substrate, wherein
the ink-receiving layer contains an inorganic pigment, a binder, and a compound containing aluminum, silicon, and at least one element selected from Group 2 and 3 elements of the periodic table, and
wherein the compound content is in the range of 0.1 mass % to 30 mass % relative to the inorganic pigment content,
wherein the compound has a —Si—O-M-O—Si— structure, where M represents the at least one element selected from Group 2 and 3 elements of the periodic table, and —Si—O—Al—O—Si— structure, and
wherein the at least one element selected from Group 2 and 3 elements of the periodic table is at least one element selected from magnesium (Mg), calcium (Ca), strontium (Sr), yttrium (Y), lanthanum (La) and cerium (Ce).

2. The recording medium according to claim 1, wherein the number of atoms of the at least one element selected from Group 2 and 3elements of the periodic table is at least 0.1 times and at most 5 times the number of silicon atoms in the compound.

3. The recording medium according to claim 1, wherein the number of aluminum atoms is at least 0.1 times and at most 5 times the number of silicon atoms in the compound.

4. The recording medium according to claim 1, wherein the inorganic pigment is at least one selected from an alumina hydrate and gas-phase silica.

5. The recording medium according to claim 1, wherein the inorganic pigment is surface-treated with the compound.

6. A method of producing the recording medium according to claim 1, wherein preparation of the compound involves adding a compound containing at least one element selected from Group 2 and 3elements of the periodic table, a compound containing aluminum, and a silane coupling agent to a liquid solvent containing at least any of water and alcohol and subsequently hydrolyzing and condensing the silane coupling agent in the liquid solvent.

* * * * *